United States Patent [19]

Igarashi et al.

[11] Patent Number: 4,851,946

[45] Date of Patent: Jul. 25, 1989

[54] LIGHTNING ARRESTER

[75] Inventors: Yoshio Igarashi, Machida; Tetsumi Jinno, Yokohama, both of Japan

[73] Assignee: Sankosha Corporation, Tokyo, Japan

[21] Appl. No.: 261,885

[22] Filed: Oct. 25, 1988

[30] Foreign Application Priority Data

Nov. 5, 1987 [JP] Japan ................................ 62-280215

[51] Int. Cl.[4] ................................................ H02H 1/04

[52] U.S. Cl. .................................... 361/124; 361/120; 361/127; 361/129; 361/117

[58] Field of Search ............... 361/110, 111, 117, 118, 361/120, 124, 126, 127, 128, 129

[56] References Cited

U.S. PATENT DOCUMENTS

| | | | |
|---|---|---|---|
| 4,056 840 | 11/1977 | Lundsgaard et al. | 361/124 |
| 4,062,054 | 12/1977 | Simakat | 361/120 X |
| 4,150,414 | 4/1979 | Pagliuca | 361/124 |
| 4,317,153 | 2/1982 | Coren | 361/124 X |
| 4,326,231 | 4/1982 | Coren | 361/120 X |
| 4,642,723 | 2/1987 | Achtnig et al. | 361/124 |

*Primary Examiner*—Drek S. Jennings
*Attorney, Agent, or Firm*—Foley & Lardner, Schwartz, Jeffery, Schwaab Mack, Blumenthal & Evans

[57] ABSTRACT

When the lightning device is overheated because of its long-time discharge, a conductive member having a low melting point is softened and melted by the overheated tube to short-circuit an air gap between main discharge electrodes. The main discharge electrodes are thus short-circuited to protect the lightning arrester from being overheated and damaged. When discharge function is lost between the main discharge electrodes, air discharge is carried out in the air gap. Electric appliances and machine connected to the lightning arrester can be thus protected from high voltage surge.

8 Claims, 5 Drawing Sheets

LIGHTNING ARRESTER

BACKGROUND OF THE INVENTION

1. Field of the Invention

The present invention relates to a lightning arrester provided with a gas-filled discharge tube for protecting electric appliances from a voltage surge caused by lightning or the like, and more particularly relates to a lightning arrester provided with a fail-safe system which is capable of protecting the appliances from damages even when the lightning arrester is subjected to a prolonged voltage surge and thus heated, and also provided with a vent-safe system capable of discharging a voltage surge to the ground, in place of the gas-filled discharge tube in event that the discharge tube loses its discharge capability.

2. Description of the Related Art

Gas-filled discharge tubes are incorporated in lightning arresters and function as overvoltage protectors, for protecting electric appliances from a voltage surge. Each gas-filled discharge tube comprises a cylindrical ground electrode, two insulation rings connected, at one end, to both ends of the ground electrode, respectively, and two main electrodes connected to the other ends of the insulation rings, respectively. To protect an electric appliance from a voltage surge, the ground electrodes are connected to the ground, and the main electrode is connected to two lines to which the electric appliance is connected.

When the lines are subjected to a voltage surge, the main electrode and the ground electrode cooperate, thus discharging the surge voltage to the ground, thereby protecting the electric appliance from the voltage surge.

When the voltage surge lasts short because it has resulted from lightning, it takes the discharge tube but a short time to discharge the surge voltage to the ground, and the tube is not overheated. When the voltage surge lasts long because it has resulted from the contact between the line and a power source line, it takes the tube a long time to discharge the surge voltage to the ground, and the tube is overheated. When the overheating occurs, the gas may leak from the discharge tube, in which case the discharge tube can no longer perform its function.

It is therefore required that a lightning arrester be provided with a fail- and vent-safe systems to prevent the gas-filled discharge tube from being disabled.

A lightning arrester disclosed in U.S. Pat. No. 4,150,414, for example, is provided with the fail- and vent-safe systems. A gas-contained discharge tube in this lightning arrester comprises a center metal cylinder (or ground electrode), insulation rings and a metal cap (or main electrode). A short-circuiting metal fitting comprising two clips and a coupling for connecting the two clips as a unit is attached to the gas-contained discharge tube by mean of the clips. The clips of the short-circuiting metal fitting is conductively connected to the metal cap. A heat-melted insulation sleeve is fitted onto the center cylinder and the short-circuiting metal fitting clips the center cylinder through the insulation sleeve. The short-circuiting metal fitting is thus insulated from the center cylinder while it is electrically connected to the metal cap. When the discharge tube is overheated because of long-time discharge and the insulation sleeve is thus melted, the clips of the short-circuiting metal fitting are contacted with the center cylinder due to their elasticity. The metal cap and the center cylinder are thus short-circuited through the short-circuiting metal fitting to thereby protect the lightning arrester and the electric appliances and machines connected to the lightning arrester from being abnormally overheated.

A metal rod is conductively attached to the center cylinder and the short-circuiting metal fitting is provided with a hole at a part thereof, which is closed by a collared metal member. An insulation member is sandwiched between the metal rod and the ceiling of the metal member to form an air gap therebetween. When the gas-contained discharge tube is broken and gas is thus leaked, therefore, discharge is carried out in the air gap to keep lightning arresting ability unchanged.

In the case of this lightning arrester disclosed by U.S. Pat. No. 4,150,414, however, the clips of the short-circuiting metal fitting must have a spring larger than a certain value. This makes the arm-like clips long and the whole of the device is made large in size accordingly. Further, the insulation member is interposed between the metal rod and the metal member to form the air gap therebetween. This makes the device complicated in structure and high in cost.

SUMMARY OF THE INVENTION

The present invention is intended to eliminate the above-mentioned drawbacks.

The object of the present invention is therefore to provide a lightning arrester provided with fail- and vent-safe systems but made simpler in construction and smaller in size with higher reliability.

A lightning arrester according to the present invention comprises a gas-contained discharge tube having a pair of electrodes which are air-tightly attached to both open ends of a hollow cylinder made of insulation material and whose discharge faces are opposed to each other with a clearance between them in the hollow cylinder, an insulation support for supporting the gas-contained discharge tube, plural conductive fittings molded with the insulation support in such a way that both end portions of the conductive fittings which are insulated and separated from each other are extended downward from both sides of the insulation support to contact the paired electrodes, respectively, and that center portions of the conductive fittings located in a cut-away portion of the insulation support are insulated and separated from each other to form a discharge clearance between them, and a conductive member having a low melting point and arranged in the cut-away portion of the insulation support and pressed against the center portion of one of the conductive fittings by a spring while being insulated and separated from the center portion of the other at the time when the gas-contained discharge tube is under normal operation, but said conductive member being heated and melted, flowing into the discharge clearance or bridging the discharge clearance due to the spring, to short-circuit the discharge clearance at the time when the gas-contained discharge tube is overheated.

When short-time surge of high voltage caused by thunder or the like is applied to a line connected to the lightning arrester of the present invention, discharge is carried out between the paired electrodes to lead the high voltage surge to the ground, thereby protecting electric appliances and machines connected to the line.

When high voltage surge is continuously applied to the lightning arrester of the present invention, the gas-contained discharge tube is overheated by heat caused by its long-time discharge. The conductive member having a low melting point is softened and melted by this overheat of the gas-contained discharge tube to short-circuit the discharge clearance. This means that the paired electrodes are short-circuited. Therefore, the lightning arrester can be protected from its being overheated and damaged, so that the electric appliances and machines connected to the line can be protected from the high voltage surge. The lightning arrester can thus fulfill its fail-safe function.

When the gas-contained discharge tube loses its discharge capacity because of gas leakage and high voltage surge is applied to this tube, discharge is carried out not in the tube but between the discharge clearance formed by the opposed conductive fittings in the cut-away portion of the insulation support. The electric appliances and machines connected to the line can be protected from the high voltage surge, thereby enabling the lightning arrester to fulfill its vent-safe function.

When air discharge is carried out, the conductive member of low melting point is softened and melted by heat caused by the air discharge to thereby render the fail-safe system operative.

According to the present invention, both of the fail- and vent-safe systems can be incorporated into the cut-away portion of the insulation support for the gas-contained discharge tube. Therefore, the lightning arrester of the present invention can be made simpler in construction and smaller in size and have higher reliability.

DETAILED DESCRIPTION OF THE PREFERRED EMBODIMENTS

Figure 1A:
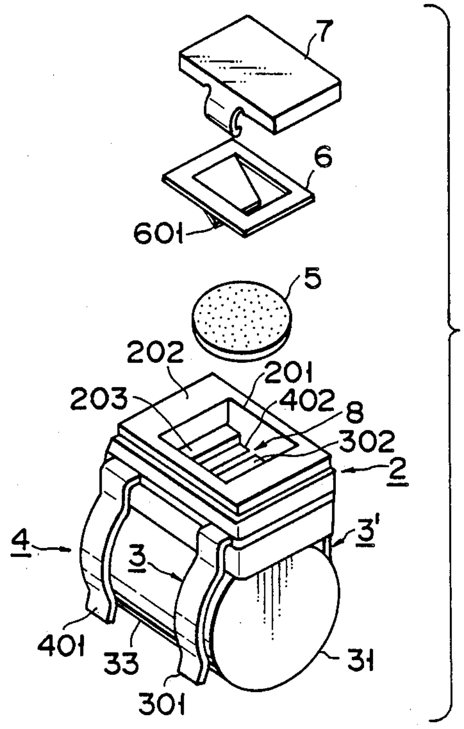
FIGS. 1 and 1A are perspective views showing an example of the lightning arrester according to the present invention developed.
Figure 1:
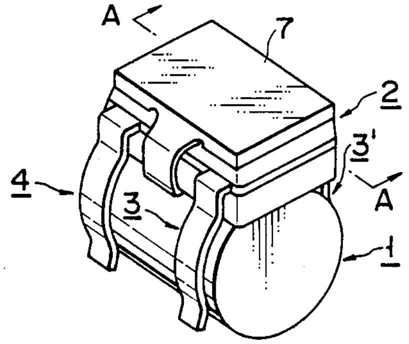
Figure 2:
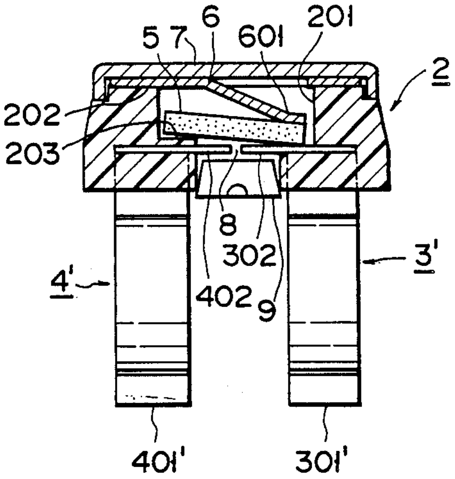
FIG. 2 is a sectional view taken along a line A—A in FIG. 1 to show an insulation support.
Figure 3A:
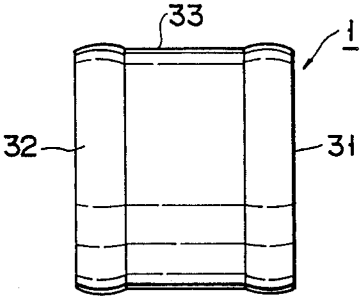
FIG. 3A is a side view showing a gas-contained discharge tube in FIG. 1.
Figure 3B:
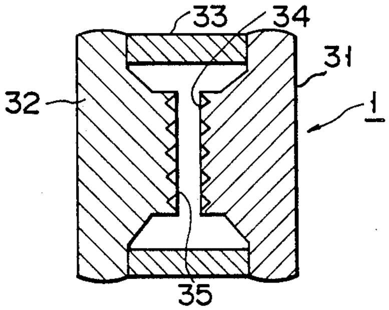
FIG. 3B is a vertically-sectioned view showing the gas-contained discharge tube.

FIG. 1 is a perspective view showing an example of the lightning arrester according to the present invention developed and FIG. 2 is a sectional view taken along a line A—A in FIG. 1. Gas-contained discharge tube 1 shown in FIGS. 1 and 2 comprises hollow cylinder 33 made of insulation material, and a pair of electrodes 31 and 32 air-tightly attached to both open ends of hollow cylinder 33 in such a way that their discharge faces 34 and 35 are opposed to each other with a clearance between them in hollow cylinder 33, as shown in FIG. 3. This gas-contained discharge tube 1 is detachably supported by insulation support 2 in such a manner as will be described later. A pair of conductive fittings or U-shaped elastic metal plates 3, 3′ and 4, 4′ which are insulated and separated from each other are molded together with insulation support 2 in such an arrangement as will be described later. Namely, both end portions 301, 301′ and 401, 401′ of metal plates 3, 3′ and 4, 4′ are extended downward from both sides of insulation support 2 to electrically contact paired electrodes 31 and 32, respectively. Center portions 302 and 402 of metal plates 3, 3′ and 4, 4′ are insulated and separated from each other in cut-away portion 201 of insulation support 2 to form discharge clearance (or air gap) 8 between them. Gas-contained discharge tube 1 is fitted into insulation support 2 between metal plate 3 and 3′ and between metal plate 4 and 4′ against their spring force, electrically contacting its electrode 31 with metal plate 3 and 3′ while electrically contacting its electrode 32 with metal plate 4 and 4′. Top 202 is formed above center portions 302 and 402 of metal plates 3, 3′ and 4, 4′ in cut-away portion of insulation support 2 and spring 6 and cover 7 are mounted on top 202, as shown in FIGS. 1A and 2. Further, stepped portion 203 is formed above and adjacent to center portion 402 in cut-away portion 201. When conductive member such as solder disc 5 having a low melting point is mounted on stepped portion 203 at one end thereof, therefore, this solder disc 5 is not electrically and directly contacted with center portion 402.

It will be described how an example of the lightning arrester according to the present invention is assembled.

As shown in FIGS. 1 and 2, insulation support 2 is molded in such a way that both end portions 301, 301′ and 401, 401′ of elastic metal plates 3, 3′ and 4, 4′ are extended downward from both sides of insulation support 2 and that center portions 302 and 402 of metal plates 3, 3′ and 4, 4′ form air gap 8 between them in cut-away portion of insulation support 2. Solder disc 5 is arranged in cut-away portion 201 in such a way that it is mounted on stepped portion 203 at its one end not to directly contact center portion 402 of metal plate 4, 4′ while it is mounted on the top of center portion 302 of metal plate 3, 3′ at its other end. Solder disc 5 is thus kept above air gap 8. Spring 6 is mounted on top 202, covering cut-away portion 201 and contacting its tongue 601 with the top of solder disc 5 to urge solder disc 5 toward air gap 8. Cover 7 is mounted on spring 6 to prevent something like dust from entering into cut-away portion 201. Gas-contained discharge tube 1 is finally fitted between metal plate 3 and 3′ and between metal plate 4 and 4′ against their spring pressure, electrically contacting its electrodes 31 and 32 with metal plates 3, 3′ and 4, 4′, respectively.

FIG. 2 is a vertically-sectioned view showing the insulation support which is employed by the above-described lightning arrester of the present invention and from which the gas-contained discharge tube is detached. In the case of the lightning arrester according to the present invention, the fail- and vent-safe systems comprise paired metal plates 3, 3′ and 4, 4′ molded together with insulation support 2, air gap 8 formed between center portions 302 and 402 of these metal plates 3, 3′ and 4, 4′, and solder disc 5 arranged above air gap 8, as shown in FIG. 2. Numeral 9 represents a cap for covering air gap 8.

When short-time surge of high voltage caused by lightning or the like is applied to a line to which the lightning arrester of the present invention shown in FIGS. 1 through 3 is connected, discharge is carried out between paired electrodes 31 and 32 of gas-contained discharge tube 1 to lead the high voltage surge to the ground through one of the electrodes or electrode 32 when it is earthed, thereby protecting electric appliances and machines connected to the line from the high voltage surge.

When high voltage surge is continuously applied between paired electrodes 31 and 32 of gas-contained discharge tube 1, gas-contained discharge tube 1 is overheated because of long-time discharge between electrodes 31 and 32. Solder disc 5 made of conductive material having a low melting point is softened and melted by the overheated tube to short-circuit air gap 8 due to spring 6. Paired electrodes 31 and 32 are thus short-circuited to thereby protect gas-contained discharge tube 1 from being damaged by overheat. The fail-safe function can be fulfilled accordingly.

When gas-contained discharge tube 1 loses its discharge capacity because of gas leakage, for example, and high voltage surge is applied to this tube, air discharge is carried out in air gap 8 formed in cut-away portion 201 of insulation support 2 instead of discharge in gas-contained discharge tube 1, thereby enabling the vent-safe function to be achieved.

Although a case where the present invention is applied to the bipolar gas-contained discharge tube has been described, the present invention can also be applied to multipolar gas-contained discharge tubes.

Figure 4A:
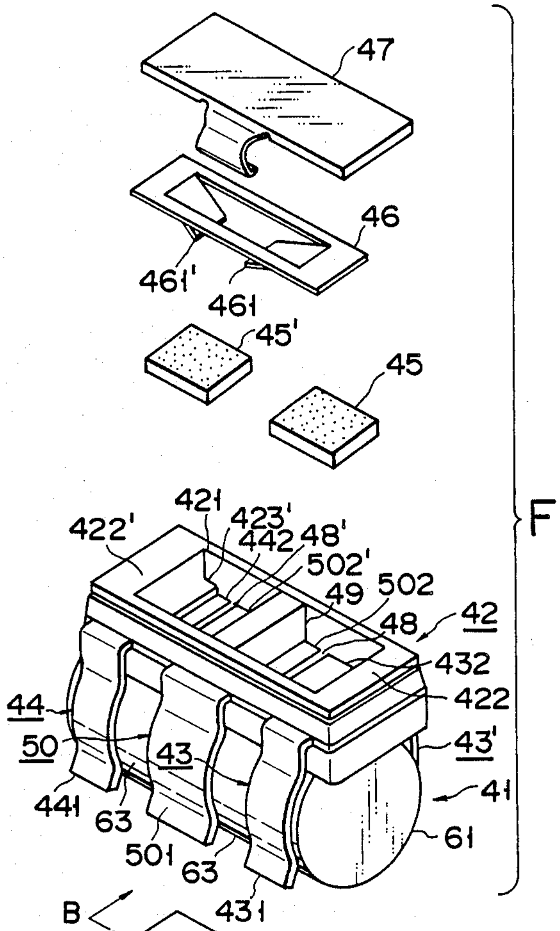
FIGS. 4 and 4A are perspective views showing another example of the lightning arrester according to the present invention developed.
Figure 4:
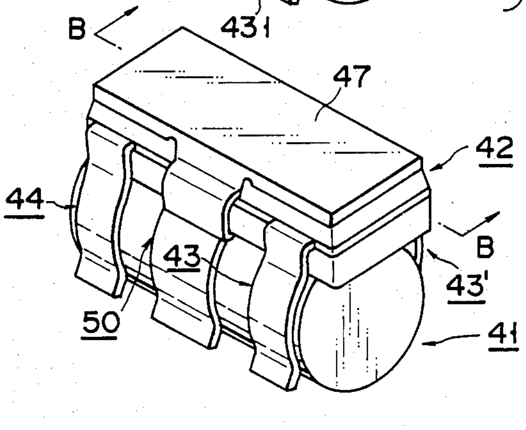
Figure 5:
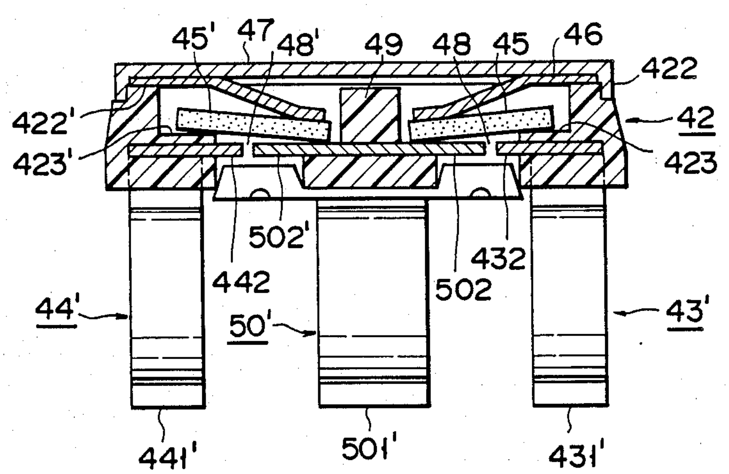
FIG. 5 is a sectional view taken along a line B—B in FIG. 4 to show an insulation support.
Figure 6A:
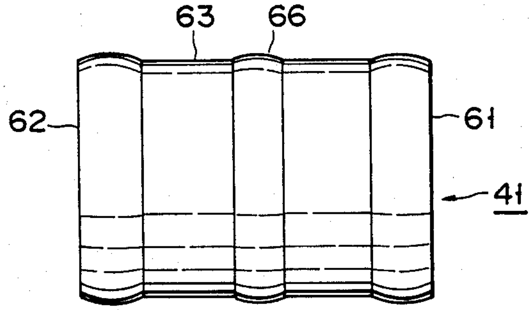
FIG. 6A is a side view showing a gas-contained discharge tube in FIG. 4.
Figure 6B:
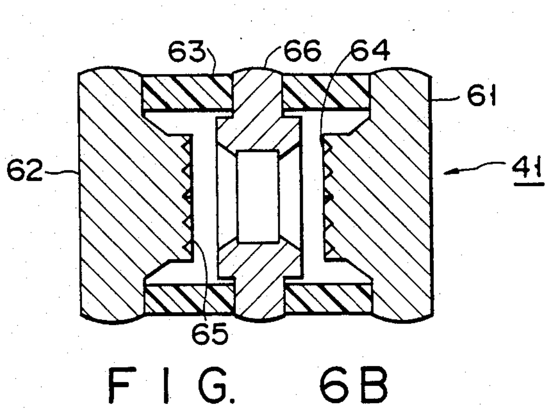
FIG. 6B is a vertically-sectioned view showing the gas-contained discharge tube in FIG. 4.

FIG. 4 is a perspective view showing another example of the lightning arrester wherein the present invention is applied to the triple polar gas-contained discharge tube. FIG. 5 is a partly-sectioned view taken along a line B—B in FIG. 4 to show another insulation support from which the gas-contained discharge tube is detached. FIGS. 6A and 6B are side and vertically-sectioned views showing the gas-contained discharge tube in FIG. 4.

Triple polar gas-contained discharge tube 41 shown in FIG. 4 comprises hollow cylinder 63 made of insulation material, a pair of electrodes 61 and 62 air-tightly attached to both open ends of hollow cylinder 63, keeping their discharge faces 64 and 65 opposed to each other with a clearance between them in hollow cylinder 63, and intermediate electrode (or ground electrode, for example) 66 air-tightly attached to the intermediate of hollow cylinder 63 and having discharge faces opposed to those 64 and 65 of electrodes 61 and 62, respectively, with a clearance between them in hollow cylinder 63.

Three U-shaped elastic metal plates 43, 43′; 44, 44′ and 50, 50′ which are insulated and separated from one another are molded together with insulation support 42 for gas-contained discharge tube 41. More specifically, both end portions 431, 431′; 441, 441′ and 501, 501′ of the metal plates are extended downward from both sides of insulation support 42, electrically contacting electrodes 61, 62 and 66, respectively. Center portions 432 and 502 of the metal plates in cut-away portion 421 of insulation support 42 are insulated and separated from each other to form discharge clearance (or air gap) 48 between them while center portions 442 and 502′ of the metal plates in cut-away portion 421′ of insulation support 42 are also insulated and separated from each other to form discharge clearance 48′ between them.

Gas-contained discharge tube 41 is fitted between metal plates 43, 43′; 44, 44′ and 50, 50′ of insulation support 42 against their spring pressure, electrically contacting its electrodes 61, 62 and 66 with metal plates 43, 43′; 44, 44′ and 50, 50′, respectively. Gas-contained discharge tube 41 is thus freely detachably supported by insulation support 42. Stepped portions 423, 423′ similar to the one 203 shown in FIG. 1 are formed in cut-away portions 421 and 421′ of insulation support 42 and solder discs 45 and 45′ are arranged in cut-away portions 421 and 421′ in such a way that they are mounted on stepped portions 423 and 423′ at their one ends and on center portions 502 and 502′ of metal plate 50 and 50′. Solder discs 45 and 45′ are thus kept over air gaps 48 and 48′, respectively. Spring 46 is mounted on tops 422 and 422′ of insulation support 42, contacting its tongues 461 and 461′ with tops of solder discs 45 and 45′ to urge solder discs 45 and 45′ toward air gaps 48 and 48′, respectively. Cover 47 is then mounted on spring 46 to hold spring 46 on tops 422 and 422′ of insulation support 42 as shown in FIG. 4A. Numeral 49 in FIGS. 4 and 5 represent a wall for partitioning air gaps 48 and 48′.

In the case of this example of the present invention shown in FIGS. 4 through 6, fail- and vent-safe functions can be created between electrode 61 and intermediate electrode 66 and between intermediate electrode 66 and electrode 62 by means of two air gaps 48, 48′ and solder discs 45, 45′ arranged above these air gaps 48 and 48′, respectively.

The lightning arrester of the present invention shown in FIG. 4 can be assembled in the same way as in the case of the one shown in FIG. 1. The lightning arrester shown in FIG. 4 is connected to a line in the same manner as the common triple polar lightning arrester and when short-time surge of high voltage caused by lightning or the like is applied to the line, gas-contained discharge tube 41 performs the same discharge operation as that in the common triple polar lightning arrester, thereby protecting electric appliances add machines connected to the line from the high voltage surge. The fail-safe function for protecting gas-contained discharge tube 41 from being damaged by overheat when high voltage surge is continuously applied to the line and the vent-safe function for causing air discharge to be carried out instead of discharge in gas-contained discharge tube 41 to protect electric appliances and machines from high voltage surge when gas-contained discharge tube 41 loses its discharge capacity are substantially same as those in the lightning arrester shown in FIG. 1. Description on these functions will be omitted accordingly.

Figure 7:
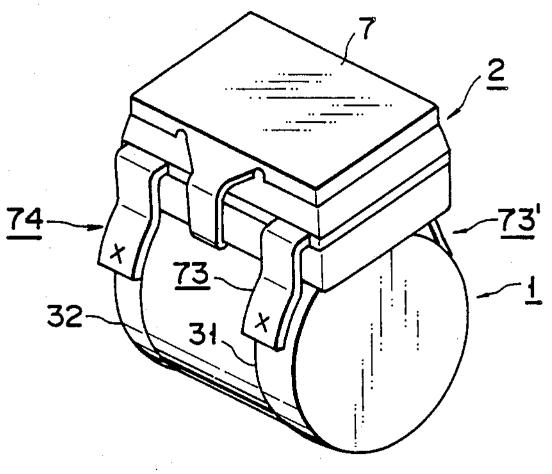
FIGS. 7 and 8 show other examples of the lightning arrester according to the present invention.

In the case of the lightning arrester shown in FIG. 1, elastic metal plates 3, 3′ and 4, 4′ are used as the conductive fittings molded together with insulation support 2, and gas-contained discharge tube 1 is freely detachably supported by insulation support using the elasticity of these metal plates, while metal plate 3 and 3′ is electrically contacted with electrode 31 and metal plate 4 and 4′ with electrode 32 by their elasticity. However, common metal plates 73, 73′ and 74, 74′ may be used instead of those 3, 3′ and 4, 4′ and common metal plates 73 and 73′ may be plated or welded to electrode 31 while common metal plates 74 and 74′ to electrode 32, as shown in FIG. 7. The arrangement of components such as fail- and vent-safe systems in a lightning arrester shown in FIG. 7 is same except metal plates 73, 73′ and 74, 74′ as that in the one shown in FIG. 1 and functions achieved by the lightning arrester shown in FIG. 7 are same as well.

Figure 8:
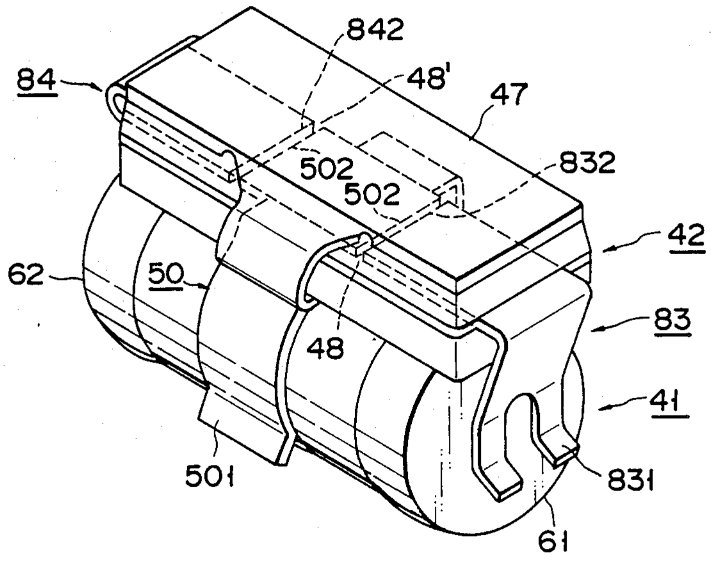

In the case of the lightning arrester shown in FIG. 4, three U-shaped elastic metal plates 43, 43′; 44, 44′ and 50, 50′ are used as the conductive fittings molded together with insulation support 42 and gas-contained discharge tube 41 is freely detachably supported by insulation support 42, using the elasticity of these metal plates, while metal plate 43, 43' is electrically contacted with electrode 61, metal plate 44, 44' with electrode 62 and metal plate 50, 50' with intermediate electrode 66 by their elasticity. As shown in FIG. 8, however, L-shaped elastic metal plates 83 and 84 may be used instead of those 43, 43' and 44, 44' . Insulation support 42 is molded together with these metal plates 83 and 84 in this case in such a way that their one ends 831 and 841 contact the end faces of electrodes 61 and 62 by their elasticity while their other ends 832 and 842 are opposed to both sides 502 and 502' of the center portion of metal plate 50, 50', respectively, to form air gaps 48 and 48' between end 832 and side 502 and between end 842 and side 502'. Gas-contained discharge tube 41 is freely detachably supported by insulation support 42, using the elasticity of these metal plates 50, 50'; 83 and 84 while metal plate 83 is electrically contacted with electrode 61, metal plate 84 with electrode 62 and metal plate 50, 50' with intermediate electrode 66 by their elasticity. The arrangement of components such as fail- and vent-safe systems in the cut-away portion of insulation support 42 in the case of a lightning arrester shown in FIG. 8 is same except metal plates 83 and 84 as that in the lightning arrester shown in FIG. 4 and functions achieved by the lightning arrester shown in FIG. 8 are same as well. In the case of the embodiment shown in FIG. 8, non-elastic common metal plates may be used instead of those 50, 50'; 83 and 84 and they may be soldered to electrodes 66, 61 and 62, respectively.

According to the present invention, fail- and vent-safe systems can be incorporated into the cut-away portion of the insulation support for the gas-contained discharge tube and this makes the device simpler in construction and smaller in size. This also makes manufacture and assembly of the device easier. Further, fail- and vent-safe systems can be incorporated into the cut-away portion of the cover. Therefore, the systems can be almost free from any influences applied from outside to enhance the reliability of the device.

What is claimed is:

1. A lightning arrester comprising a gas-contained discharge tube having a pair of electrodes which are air-tightly attached to both open ends of a hollow cylinder made of insulation material and whose discharge faces are opposed to each other with a clearance between them in the hollow cylinder, an insulation support for supporting the gas-contained discharge tube, plural conductive fittings molded together with the insulation support in such a way that both end portions of the conductive fittings which are insulated and separated from each other are extended downward from both sides of the insulation support to contact the paired electrodes, respectively, and that center portions of the conductive fittings located in a cut-away portion of the insulation support are insulated and separated from each other to form a discharge clearance between them, and a conductive member having a low melting point and arranged in the cut-away portion of the insulation support and pressed against the center portion of one of the conductive fittings by a spring while being insulated and separated from the center portion of the other at the time when the gas-contained discharge tube is under normal operation, but said conductive member being heated and melted, flowing into or bridging the discharge clearance due to the spring, to short-circuit the clearance at the time when the gas-contained discharge tube is overheated.

2. The lightning arrester according to claim 1, wherein said conductive fittings are elastic metal plates and the elasticity of said metal plates is used in such a way that the gas-contained discharge tube can be freely detachably supported by the insulation support and that said metal plates can be pressed against the electrodes to electrically connect with them.

3. The lightning arrester according to claim 1, wherein said conductive fittings are metal plates and said metal plates are soldered to the electrodes, respectively, in such a way that said metal plates can be electrically connected to the electrodes and that said gas-contained discharge tube can be supported by the insulation support.

4. The lightning arrester according to claim 1, wherein said conductive fittings are metal plates and said metal plates are welded to the electrodes, respectively, in such a way that said metal plates can be electrically connected to the electrodes and that said gas-contained discharge tube can be supported by the insulation support.

5. A lightning arrester comprising a gas-contained discharge tube of the triple polar type including a pair of electrodes which are air-tightly attached to both open ends of a hollow cylinder made of insulation material and whose discharge faces are opposed to each other with a clearance between them in the hollow cylinder and an intermediate electrode air-tightly attached to the intermediate portion of said hollow cylinder and having discharge faces opposed to those of the paired electrodes, respectively, with a clearance between them in the hollow cylinder; an insulation support for supporting the triple polar gas-contained discharge tube; three conductive fittings molded together with the insulation support in such a way that both end portions of said conductive fittings which are insulated and separated from one another are extended downward from both sides of the insulation support to contact the paired and intermediate electrodes, respectively, while center portions of the conductive fittings in cut-away portions of the insulation support are insulated and separated from one another to form discharge clearances between the center portions of the intermediate electrode and one of the other two electrodes and between the center portions of the intermediate electrode and the other of the two electrodes; and two conductive members having a low melting point and arranged in the cut-away portions in such a way that each of the conductive members is insulated and separated, at its one end, from at least one of the center portions which form the discharge clearance between them, and pressed against the other of the center portions at its other end by means of a spring at the time when the gas-contained discharge tube of the triple polar type is under normal operation, but that when the triple polar gas-contained discharge tube is overheated, they are softened and melted by the overheated tube to short-circuit each of the discharge clearances.

6. The lightning arrester according to claim 5, wherein said conductive fittings are elastic metal plates and their elasticity is used in such a way that said gas-contained discharge tube can be freely detachably supported by the insulation support and that they can be pressed against the electrodes, respectively, to electrically connect with the latter.

7. The lightning arrester according to claim 5, wherein said conductive fittings are metal plates and they are soldered to the electrodes, respectively, in such a way that they can be electrically connected to the electrodes and that the gas-contained discharge tube can be supported by the insulation support.

8. The lightning arrester according to claim 5, wherein said conductive fittings are metal plates and they are welded to the electrodes, respectively, in such a way that they can be electrically connected to the electrodes and that the gas-contained discharge tube can be supported by the insulation support.

* * * * *